United States Patent
Nakamura et al.

(10) Patent No.: US 8,742,719 B2
(45) Date of Patent: Jun. 3, 2014

(54) POWER SUPPLY DEVICE, POWER RECEIVING DEVICE AND VEHICLE INCLUDING POWER RECEIVING DEVICE, AND CONTROL METHOD FOR POWER SUPPLY SYSTEM

(75) Inventors: Toru Nakamura, Toyota (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/817,934

(22) PCT Filed: Sep. 2, 2011

(86) PCT No.: PCT/IB2011/002020
§ 371 (c)(1),
(2), (4) Date: Feb. 20, 2013

(87) PCT Pub. No.: WO2012/032385
PCT Pub. Date: Mar. 15, 2012

(65) Prior Publication Data
US 2013/0162205 A1    Jun. 27, 2013

(30) Foreign Application Priority Data

Sep. 10, 2010 (JP) ................................ 2010-202692

(51) Int. Cl.
*H02J 7/00* (2006.01)
(52) U.S. Cl.
USPC ............................ 320/108; 320/109; 455/411
(58) Field of Classification Search
USPC ................. 320/108, 109, 115, 139; 379/443; 455/89, 411, 437
See application file for complete search history.

(56) References Cited

U.S. PATENT DOCUMENTS

| | | | | |
|---|---|---|---|---|
| 5,991,170 A * | 11/1999 | Nagai et al. | ..................... | 363/20 |
| 6,028,413 A * | 2/2000 | Brockmann | ................... | 320/108 |
| 7,109,682 B2 * | 9/2006 | Takagi et al. | ................... | 320/108 |
| 2005/0116683 A1 * | 6/2005 | Cheng et al. | ................... | 320/108 |
| 2008/0174267 A1 * | 7/2008 | Onishi et al. | ................... | 320/108 |
| 2008/0298305 A1 * | 12/2008 | Nakamura | ..................... | 370/328 |
| 2009/0302800 A1 * | 12/2009 | Shiozaki et al. | .............. | 320/108 |
| 2010/0115474 A1 | 5/2010 | Takada et al. | | |
| 2010/0156346 A1 * | 6/2010 | Takada et al. | ................. | 320/108 |
| 2010/0225271 A1 | 9/2010 | Oyobe et al. | | |

FOREIGN PATENT DOCUMENTS

| | | |
|---|---|---|
| CA | 2 738 120 A1 | 4/2010 |
| JP | A-09-103037 | 4/1997 |
| JP | A-2002-101578 | 4/2002 |
| JP | A-2007-231567 | 9/2007 |

(Continued)

*Primary Examiner* — Yalkew Fantu
(74) *Attorney, Agent, or Firm* — Oliff, PLC

(57) ABSTRACT

A power supply device supplies electric power to a power receiving device including a power receiving unit in a non-contact manner. The power supply device includes a power source device that generates electric power with a predetermined frequency; a power transmitting unit that receives the electric power from the power source device, and that resonates with the power receiving unit through an electromagnetic field, thereby transmitting the electric power to the power receiving unit in the non-contact manner; a detection device that detects reflected electric power to the power source device; a communication device that receives information regarding a power receiving situation in the power receiving device; and a control device that controls electric power transmission from the power transmitting unit based on the information regarding the power receiving situation and the reflected electric power.

10 Claims, 5 Drawing Sheets

(56) References Cited

FOREIGN PATENT DOCUMENTS

| JP | A-2009-106136 | | 5/2009 |
| JP | A-2010-068634 | | 3/2010 |
| JP | 2010-141976 | * | 6/2010 |
| JP | A-2010-130800 | | 6/2010 |
| JP | A-2010-141976 | | 6/2010 |
| JP | A-2010-141977 | | 6/2010 |
| JP | A-2011-250555 | | 12/2011 |
| WO | WO 2011/148254 A2 | | 12/2011 |

* cited by examiner

POWER SUPPLY DEVICE, POWER RECEIVING DEVICE AND VEHICLE INCLUDING POWER RECEIVING DEVICE, AND CONTROL METHOD FOR POWER SUPPLY SYSTEM

BACKGROUND OF THE INVENTION

1. Field of the Invention

The invention relates to a power supply device, a power receiving device and a vehicle including the power receiving device, and a control method for a power supply system. Particularly, the invention relates to a power supply device and a power receiving device in a power supply system in which a power transmitting unit in the power supply device resonates with a power receiving unit in the power receiving device through an electromagnetic field to supply electric power from the power supply device to the power receiving device in a non-contact manner, a vehicle including the power receiving device, and a control method for the power supply system.

2. Description of Related Art

Japanese Patent Application Publication No. 2002-101578 (JP-A-2002-101578) describes a non-contact power transmitting device. The non-contact power transmitting device includes a primary coil, a secondary coil, first and second capacitors, a partial resonant inverter circuit, and a load. In the secondary coil, a voltage is induced by the primary coil. The first capacitor is connected in parallel or in series to the primary coil. The second capacitor is connected to the secondary coil. The partial resonant inverter circuit uses free oscillation due to the effect of resonance between the primary coil and the first capacitor. The load is provided at the output side of the secondary coil.

In the non-contact power transmitting device, the amplitude, frequency, and waveform of a voltage applied to the primary coil are changed in accordance with the inductance of the primary coil, which is changed in accordance with a change in a relative positional relation between the primary coil and the secondary coil. Thus, even when the relative positional relation between the primary coil and the secondary coil is changed, an output voltage or an output electric current is stabilized by changing the amplitude, frequency, and waveform of the voltage applied to the primary coil to increase the output.

Thus, in the non-contact power transmitting device, even when the relative positional relation between the primary coil and the secondary coil is changed, the output in the secondary side is easily stabilized (refer to the publication No. 2002-101578).

Three main technologies for transmitting electric power from a power supply device to a power receiving device in a non-contact manner are known. The three technologies include a technology in which electric power is transmitted through electromagnetic induction, a technology in which electric power is transmitted using microwaves, and a technology in which electric power is transmitted using a resonance method. Among them, the resonance method is a non-contact electric power transmission technology in which paired resonance units (for example, paired resonance coils) resonate with each other in an electromagnetic field (near field), and thus, electric power is transmitted through the electromagnetic field. The resonance method makes it possible to transmit great electric power, that is, several kW of electric power over a relatively long distance (for example, several meters).

When the voltage applied to the primary-side resonance unit (i.e., the power transmitting unit) is changed, the impedance of the power transmitting unit may match the impedance of a device other than the secondary-side resonance unit (i.e., the power receiving unit) or the impedance of space, and thus, electric power may be uselessly consumed.

SUMMARY OF THE INVENTION

The invention provides a power supply device that prevents the impedance of a power transmitting unit from matching the impedance of a device other than a power receiving unit or the impedance of space.

Also, the invention provides a power receiving device that prevents the impedance of a power transmitting unit from matching the impedance of a device other than a power receiving unit or the impedance of space.

Also, the invention provides a power supply system in which the impedance of a power transmitting unit is prevented from matching the impedance of a device other than a power receiving unit or the impedance of space.

A first aspect of the invention relates to a power supply device that supplies electric power to a power receiving device including a power receiving unit in a non-contact manner. The power supply device includes a power source device, a power transmitting unit, a detection device, a communication device, and a control device. The power source device generates electric power with a predetermined frequency. The power transmitting unit receives the electric power from the power source device, and resonates with the power receiving unit through an electromagnetic field, thereby transmitting the electric power to the power receiving unit in the non-contact manner. The detection device detects reflected electric power to the power source device. The communication device receives information regarding a power receiving situation in the power receiving device. The control device controls electric power transmission from the power transmitting unit based on the information regarding the power receiving situation and the reflected electric power.

The control device may calculate a power transmission efficiency that is an efficiency in electric power transmission from the power supply device to the power receiving device, based on received electric power that is the information regarding the power receiving situation, and the electric power output from the power source device, and the control device may control the electric power transmission from the power transmitting unit, based on the power transmission efficiency and the reflected electric power.

If the power transmission efficiency is lower than a predetermined first threshold value and the reflected electric power is lower than a predetermined second threshold value, the control device may stop the electric power transmission from the power transmitting unit.

If the power transmission efficiency is lower than the predetermined first threshold value and the reflected electric power is higher than a predetermined permissible value, the control device may stop the electric power transmission from the power transmitting unit.

The power supply device may further include a notification device that notifies a user when the electric power transmission from the power transmitting unit is stopped.

The power supply device may further include an impedance variable device provided between the power source device and the power transmitting unit. The power receiving device may include a load connected to the power receiving unit. The control device may set an initial value of an impedance of the impedance variable device based on an impedance of the load, and may adjust the impedance of the impedance variable device to decrease the reflected electric power.

The load may include a power storage device that is rechargeable, and the control device may set the initial value of the impedance of the impedance variable device based on a charging impedance of the power storage device, the charging impedance being determined in accordance with a state of charge of the power storage device.

A second aspect of the invention relates to a power receiving device that receives, in a non-contact manner, electric power output from a power transmitting unit in a power supply device. The power receiving device includes a power receiving unit, a detection device, a communication device, and a control device. The power receiving unit resonates with the power transmitting unit through an electromagnetic field, thereby receiving the electric power from the power transmitting unit in the non-contact manner. The detection device detects information regarding a power receiving situation where the power receiving unit receives the electric power. The communication device receives a detected value of reflected electric power in the power supply device. The control device generates a command for controlling electric power transmission from the power supply device, based on the information regarding the power receiving situation and the reflected electric power, and transmits the generated command to the power supply device using the communication device.

A third aspect of the invention relates to a vehicle including the power receiving device according to the above-described aspect.

A fourth aspect of the invention relates to a control method for a power supply system in which a power transmitting unit in a power supply device resonates with a power receiving unit in a power receiving device through an electromagnetic field to supply electric power from the power supply device to the power receiving device in a non-contact manner. The control method includes detecting reflected electric power to a power source device in the power supply device; detecting information regarding a power receiving situation in the power receiving device; and controlling electric power transmission from the power supply device to the power receiving device based on the information regarding the power receiving situation and the reflected electric power.

Controlling the electric power transmission may include calculating a power transmission efficiency that is an efficiency in the electric power transmission from the power supply device to the power receiving device, based on received electric power that is the information regarding the power receiving situation, and electric power output from the power source device; and controlling electric power transmission from the power transmitting unit based on the power transmission efficiency and the reflected electric power.

Controlling the electric power transmission from the power transmitting unit may include determining whether the power transmission efficiency is lower than a predetermined first threshold value; determining whether the reflected electric power is lower than a predetermined second threshold value, if it is determined that the power transmission efficiency is lower than the first threshold value; and stopping the electric power transmission from the power transmitting unit, if it is determined that the reflected electric power is lower than the second threshold value.

Controlling the electric power transmission from the power transmitting unit may further include determining whether the reflected electric power is higher than a predetermined permissible value, if it is determined that the power transmission efficiency is lower than the first threshold value; and stopping the electric power transmission from the power transmitting unit, if it is determined that the reflected electric power is higher than the permissible value.

The control method according to the above-described aspect may further include notifying a user when the electric power transmission from the power transmitting unit is stopped.

The power supply device may include an impedance variable device provided between the power source device and the power transmitting unit. The power receiving device may include a load connected to the power receiving unit. The control method may further include setting an initial value of an impedance of the impedance variable device based on an impedance of the load; and adjusting the impedance of the impedance variable device to decrease the reflected electric power.

The load may include a power storage device that is rechargeable. In setting the initial value of the impedance, the initial value of the impedance of the impedance variable device may be set based on a charging impedance of the power storage device, the charging impedance being determined in accordance with a state of charge of the power storage device.

In the above-described aspects of the invention, the electric power transmission from the power transmitting unit is controlled based on the information regarding the power receiving situation in the power receiving device and the reflected electric power to the power source device. Thus, if the reflected electric power is low although the power receiving situation in the power receiving device is not good, it is determined that the impedance of the power transmitting unit matches the impedance of a device other than the power receiving unit or the impedance of space, and thus, measures are taken, for example, the electric power transmission is stopped.

Thus, according to the above-described aspects of the invention, it is possible to prevent the impedance of the power transmitting unit from matching the impedance of a device other than the power receiving unit or the impedance of space. As a result, it is possible to transmit electric power with a high power transmission efficiency.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
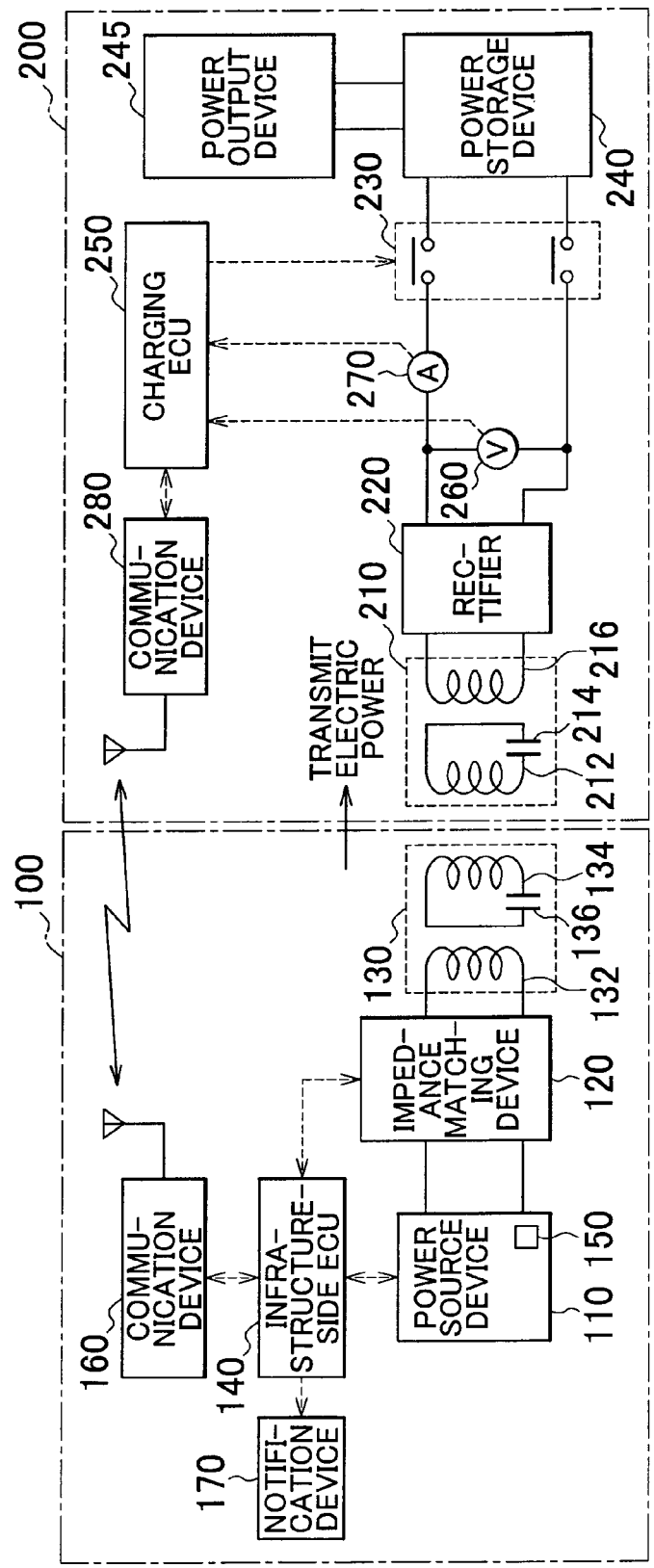
FIG. 1 is a functional block diagram showing the entire configuration of a vehicle power supply system according to an embodiment of the invention.

Hereinafter, embodiments of the invention will be described in detail with reference to the drawings. In the drawings, the same or corresponding portions will be denoted by the same reference numerals, and the description thereof will not be repeated.

FIG. 1 is a functional block diagram showing the entire configuration of a vehicle power supply system according to an embodiment of the invention. As shown in FIG. 1, the vehicle power supply system includes a power supply device 100 and a vehicle 200.

The power supply device 100 includes a power source device 110, an impedance matching device 120, a power transmitting unit 130, an infrastructure-side electronic control unit (ECU) 140 (hereinafter, simply referred to as "ECU 140"), an electric power sensor 150, a communication device 160, and a notification device 170.

The power source device 110 generates electric power having a predetermined frequency. For example, the power source device 110 receives electric power from a system power source (not shown), and generates electric power having a predetermined frequency of 1 MHz to ten and several MHz. The power source device 110 controls the generation of electric power and the stop of electric power generation, and controls output electric power, according to commands received from the ECU 140.

The impedance matching device 120 is provided between the power source device 110 and the power transmitting device 130. The impedance matching device 120 is configured so that an impedance therein is changeable. In the impedance matching device 120, the impedance is changed according to a command received from the ECU 140. Thus, the impedance matching device 120 matches the input impedance of a resonance system, which includes the power transmitting unit 130 and a power receiving unit 210 in the vehicle 200, to the output impedance of the power source device 110.

Figure 2:
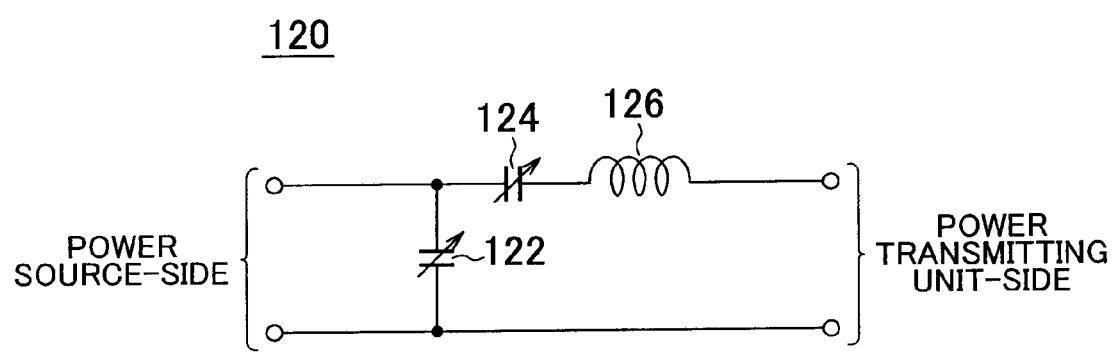
FIG. 2 is a circuit diagram showing an example of the circuit configuration of an impedance matching device shown in FIG. 1.

FIG. 2 is a circuit diagram showing an example of the circuit configuration of the impedance matching device 120 shown in FIG. 1. As shown in FIG. 2, the impedance matching device 120 includes variable capacitors 122 and 124, and a coil 126. The variable capacitor 122 is connected in parallel to the power source device 110 (shown in FIG. 1). The variable capacitor 124 and the coil 126 are disposed between the power source device 110 and the power transmitting unit 130 (shown in FIG. 1), and are connected in series to the power source device 110 and the power transmitting unit 130.

In the impedance matching device 120, the impedance is changed by changing the capacitance of at least one of the variable capacitors 122 and 124 according to a command received from the ECU 140 (shown in FIG. 1). Thus, the impedance matching device 120 matches the input impedance of the resonance system to the output impedance of the power source device 110.

Although not shown in the drawings, the coil 126 may be configured as a variable coil, and the impedance may be changed by changing the inductance of the variable coil.

Referring to FIG. 1 again, the power transmitting unit 130 includes a primary coil 132, a primary self-resonant coil 134, and a capacitor 136. The primary coil 132 is located at a predetermined distance from the primary self-resonant coil 134, and disposed coaxially with the primary self-resonant coil 134. The primary coil 132 is magnetically coupled to the primary self-resonant coil 134 through electromagnetic induction. High-frequency electric power is supplied from the power source device 110 to the primary coil 132, and the primary coil 132 supplies the high-frequency electric power to the primary self-resonant coil 134 through electromagnetic induction.

The primary self-resonant coil 134 receives electric power from the primary coil 132 through electromagnetic induction, and the primary self-resonant coil 134 resonates with a secondary self-resonant coil 212 in the power receiving unit 210 provided in the vehicle 200 through an electromagnetic field, thereby transmitting electric power to the vehicle 200 in a non-contact manner. The primary self-resonant coil 134 is provided with the capacitor 136. For example, the capacitor 136 is connected between both end portions of the primary self-resonant coil 134. The diameter of the primary self-resonant coil 134, the number of turns of the primary self-resonant coil 134, and the capacitance of the capacitor 136 are appropriately set so that, for example, a Q value becomes large (for example, Q>100) and a coupling degree κ becomes large, based on, for example, a distance from the secondary self-resonant coil 212 in the vehicle 200, and a resonant frequency.

The ECU 140 receives, from the communication device 160, information regarding a power receiving situation in the vehicle 200 that is a situation in the vehicle 200 when electric power is supplied from the power supply device 100 to the vehicle 200, that is, when the vehicle 200 receives electric power from the power supply device 100. The information regarding the power receiving situation includes information such as received electric power, a received voltage, and a received electric current in the vehicle 200. For example, the ECU 140 receives, from the communication device 160, information regarding the state of charge (hereinafter, referred to as "SOC") of a power storage device 240 (described later) provided in the vehicle 200, and a power supply start command for starting power supply and a power supply end command for ending power supply, in addition to the information regarding the power receiving situation. The above-described information is transmitted from the vehicle 200 to the communication device 160, and thus, the communication device 160 receives the above-described information.

The electric power sensor 150 detects the value of traveling-wave electric power and the value of reflected electric power, and the ECU 140 receives the detected values from the electric power sensor 150. The traveling-wave electric power is electric power output from the power source device 110. The reflected electric power is electric power reflected and returned to the power source device 110 after electric power is output from the power source device 110. When electric power is supplied from the power supply device 100 to the vehicle 200, the ECU 140 controls the electric power transmission from the power transmitting unit 130 based on the information regarding the power receiving situation in the vehicle 200 and the reflected electric power to the power source device 110.

More specifically, the ECU 140 calculates a power transmission efficiency η(=the received electric power/the traveling-wave electric power), based on the received electric power that is the information regarding the power receiving situation in the vehicle 200, and the electric power output from the power source device 110 (i.e., the traveling-wave electric power). The power transmission efficiency η is an efficiency in the electric power transmission from the power supply device 100 to the vehicle 200. If the power transmission efficiency η is lower than a predetermined threshold value ηth and the reflected electric power is lower than a predetermined threshold value Pth, the ECU 140 stops the electric power transmission from the power transmitting unit 130 by stopping the power source device 110.

Also, if the power transmission efficiency η is lower than the predetermined threshold value ηth and the reflected electric power is higher than a predetermined permissible value, the ECU 140 stops the electric power transmission from the power transmitting unit 130 by stopping the power source device 110. When the electric power transmission from the power transmitting unit 130 is stopped, the ECU 140 notifies the notification device 170 accordingly.

The ECU 140 sets the initial value of the impedance of the impedance matching device 120 based on the charging impedance of the power storage device 240 provided in the vehicle 200. When electric power is supplied from the power supply device 100 to the vehicle 200, the ECU 140 adjusts the impedance of the impedance matching device 120 to decrease the reflected electric power.

When the initial value of the impedance of the impedance matching device 120 is set, for example, a map prepared in advance to indicate a relation between the charging impedance of the power storage device 240 and the impedance of the impedance matching device 120 is used. The charging impedance of the power storage device 240 is determined in accordance with the SOC of the power storage device 240. The method of setting the initial value of the impedance of the impedance matching device 120, and the method of adjusting the value of the impedance of the impedance matching device 120 will be described in detail later.

The electric power sensor 150 detects the reflected electric power to the power source device 110, and the traveling-wave electric power (i.e., electric power output from the power source device 110), and outputs the detected values to the ECU 140. It is possible to employ, as the electric power sensor 150, various sensors that can detect reflected electric power to a power source device and traveling-wave electric power output from the power source device.

The communication device 160 is a communication interface for communicating with a communication device 280 in the vehicle 200. The communication device 160 receives the information such as the information regarding the power receiving situation in the vehicle 200, and the SOC of the power storage device 240 provided in the vehicle 200, and outputs the information to the ECU 140.

On the basis of a command from the ECU 140, the notification device 170 notifies a user that the electric power transmission from the power supply device 100 to the vehicle 200 has been stopped by a stop process (described later) performed by the ECU 140.

The vehicle 200 includes the power receiving unit 210, a rectifier 220, a charging relay 230, the power storage device 240, a power output device 245, a charging ECU 250, a voltage sensor 260, an electric current sensor 270, the communication device 280, and an antenna 282.

The power receiving unit 210 includes the secondary self-resonant coil 212, a capacitor 214, and a secondary coil 216. The secondary self-resonant coil 212 resonates with the primary self-resonant coil 134 in the power supply device 100 thorough an electromagnetic field, thereby receiving electric power from the primary self-resonant coil 134 in a non-contact manner.

The secondary self-resonant coil 212 is provided with the capacitor 214. For example, the capacitor 214 is connected between both end portions of the secondary self-resonant coil 212. The diameter of the secondary self-resonant coil 212, the number of turns of the secondary self-resonant coil 212, and the capacitance of the capacitor 214 are appropriately set so that, for example, the Q value becomes large (for example, Q>100) and the coupling degree κ becomes large, based on, for example, a distance from the primary self-resonant coil 134 in the power supply device 100, and the resonant frequency.

The secondary coil 216 is located at a predetermined distance from the secondary self-resonant coil 212, and is disposed coaxially with the secondary self-resonant coil 212. The secondary coil 216 is able to be magnetically coupled to the secondary self-resonant coil 212 through electromagnetic induction. The secondary coil 216 takes out, through electromagnetic induction, electric power received by the secondary self-resonant coil 212, and outputs the electric power to the rectifier 220.

The rectifier 220 rectifies the electric power (i.e., AC power) that has been taken out from the secondary self-resonant coil 212 using the secondary coil 216, and outputs the rectified electric power to the power storage device 240. The charging relay 230 is provided between the rectifier 220 and the power storage device 240. The charging relay 230 is turned on/off by the charging ECU 250.

The power storage device 240 is a DC power source that is rechargeable. For example, the power storage device 240 includes a secondary battery such as a lithium ion secondary battery or a nickel hydride secondary battery. The power storage device 240 stores electric power output from the rectifier 220, and regenerative electric power generated by the power output device 245. The power storage device 240 supplies the stored electric power to the power output device 245. It is possible to employ a capacitor with a large capacitance, as the power storage device 240. Any device may be employed as the power storage device 240, as long as the device is an electric power buffer that is able to temporarily store electric power supplied from the power supply device 100 and regenerative electric power generated by the power output device 245, and is able to supply the stored electric power to the power output device 245.

The power output device 245 generates driving power for driving the vehicle 200, using electric power stored in the power storage device 240. Although not shown in the drawings, the power output device 245 includes, for example, an inverter that receives electric power from the power storage device 240, a motor driven by the inverter, and drive wheels driven by the motor. The power output device 245 may include a generator used to charge the power storage device 240 with electric power, and an engine that drives the generator.

The voltage sensor 260 detects the received voltage rectified by the rectifier 220, and outputs the detected value to the charging ECU 250. The electric current sensor 270 detects the received electric current output from the rectifier 220, and outputs the detected value to the charging ECU 250.

When the charging ECU 250 receives a charging start trigger indicating that the charging of the power storage device 240 should be started using the power supply device 100, the charging ECU 250 outputs a power transmission start command to the communication device 280, and turns the charging relay 230 on. The charging start trigger may be generated by a switch operated by the user, or may be generated inside the charging ECU 250 when a predetermined condition is fulfilled.

When electric power is supplied to the power supply device 100 to the vehicle 200, the charging ECU 250 receives the values detected by the voltage sensor 260 and the electric current sensor 270. Then, the charging ECU 250 calculates the received electric power in the vehicle 200 based on the values detected by the voltage sensor 260 and the electric current sensor 270, and then, the charging ECU 250 outputs, to the communication device 280, the calculated received electric power together with the received voltage and the received electric current. The charging ECU 250 also outputs the SOC value of the power storage device 240 to the communication device 280. The SOC of the power storage device 240 may be calculated based on the detected value of the voltage of the power storage device 240 and the detected value of a charging/discharging electric current, using various known methods.

The communication device 280 is a communication interface for communicating with the communication device 160 in the power supply device 100. The communication device 280 transmits the information such as the information regarding the power receiving situation in the vehicle 200 and the SOC value of the power storage device 240, to the ECU 140 in the power supply device 100.

In the vehicle power supply system, the charging impedance of the power storage device 240 is determined based on the SOC of the power storage device 240, and the initial value of the impedance of the impedance matching device 120 is set based on the charging impedance. After the supply of electric power from the power supply device 100 to the vehicle 200 is started, the impedance of the impedance matching device 120 is adjusted to decrease the reflected electric power to the power source device 110.

In the vehicle power supply system, the electric power transmission from the power transmitting unit 130 is controlled based on the information regarding the power receiving situation in the vehicle 200 and the reflected electric power to the power source device 110. More specifically, if the power transmission efficiency $\eta$ is lower than the predetermined threshold value $\eta th$ and the reflected electric power is lower than the predetermined threshold value Pth, the electric power transmission from the power transmitting unit 130 is stopped. If the reflected electric power is low although the power transmission efficiency $\eta$ is low, electric power is uselessly consumed because the impedance of the power transmitting unit 130 matches the impedance of a device other than the power receiving unit 210 or the impedance of space. Therefore, if the above-described condition is fulfilled, the electric power transmission from the power transmitting unit 130 is stopped.

In the vehicle power supply system, if the power transmission efficiency $\eta$ is lower than the predetermined threshold value $\eta th$ and the reflected electric power to the power source device 110 is higher than the predetermined permissible value, the electric power transmission from the power transmitting unit 130 is stopped for the following reason. If the reflected electric power to the power source device 110 is higher than the permissible value, the power source device 110 may malfunction.

After the electric power transmission from the power transmitting unit 130 is stopped based on the information regarding the power receiving situation in the vehicle 200 and the reflected electric power to the power source device 110, the notification device 170 notifies the user that an abnormal situation has occurred. Also, when the electric power transmission is stopped due to the power storage device being fully charged, or due to the intension of the user, the notification device 170 notifies the user accordingly.

Figure 3:
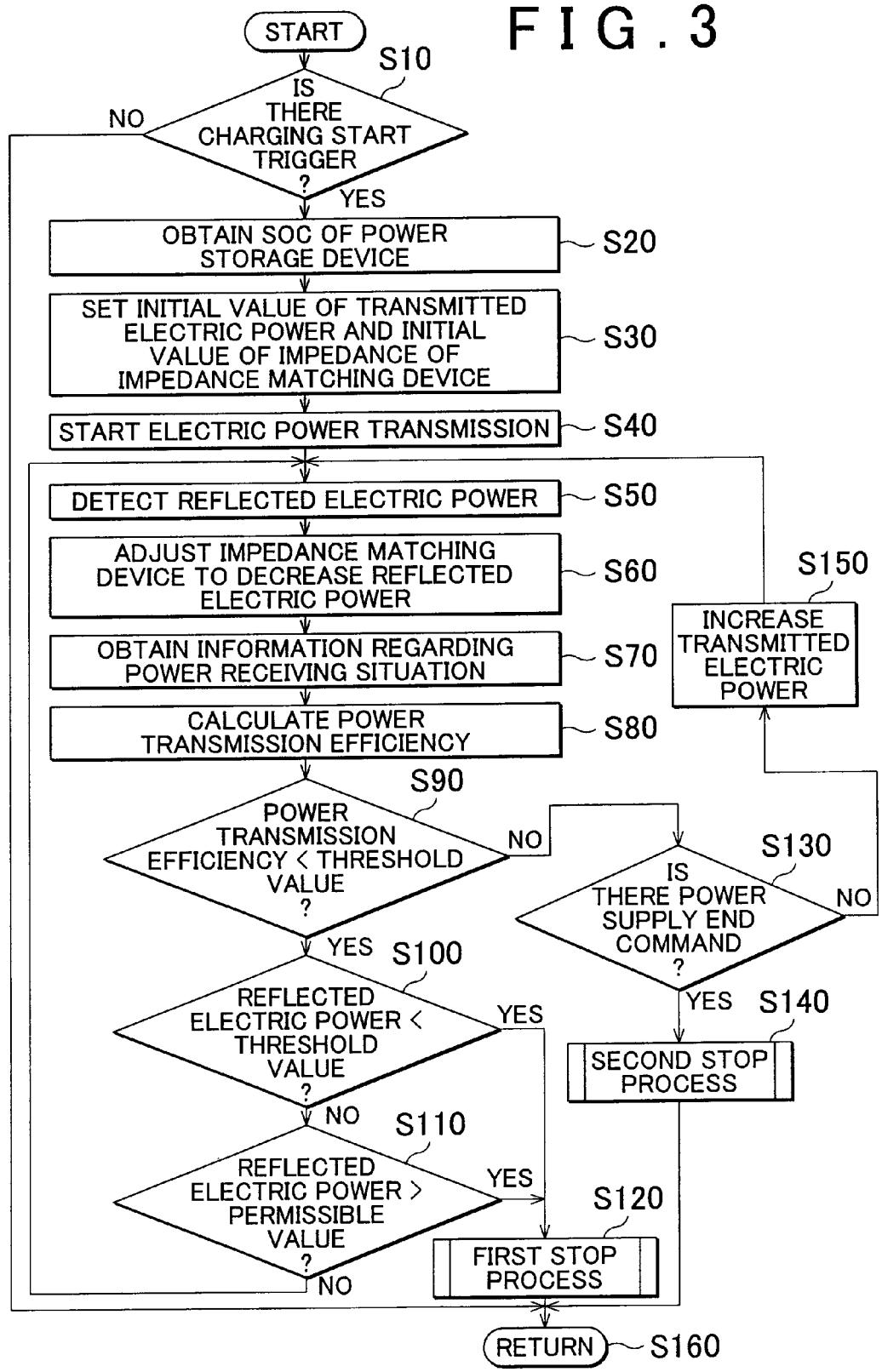
FIG. 3 is a flowchart used to explain steps performed by an infrastructure-side ECU shown in FIG. 1.

FIG. 3 is a flowchart used to explain steps performed by the infrastructure-side ECU 140 shown in FIG. 1. As shown in FIG. 3, the ECU 140 determines whether there is the charging start trigger indicating that the charging should be started using the power supply device 100 (step S10). The charging start trigger is generated in the vehicle 200, and transmitted from the communication device 280 to the power supply device 100. However, the charging start trigger may be generated in the power supply device 100.

If it is determined that there is the charging start trigger (YES in step S10), the ECU 140 obtains the information regarding the SOC of the power storage device 240 provided in the vehicle 200 (step S20). The SOC of the power storage device 240 is calculated in the vehicle 200, and transmitted from the communication device 280 to the power supply device 100.

Then, the ECU 140 sets the initial value of transmitted electric power that is electric power transmitted from the power supply device 100, and the initial value of the impedance of the impedance matching device 120 (step S30). Hereinafter, the method of setting each initial value will be described with reference to FIG. 4.

Figure 4:
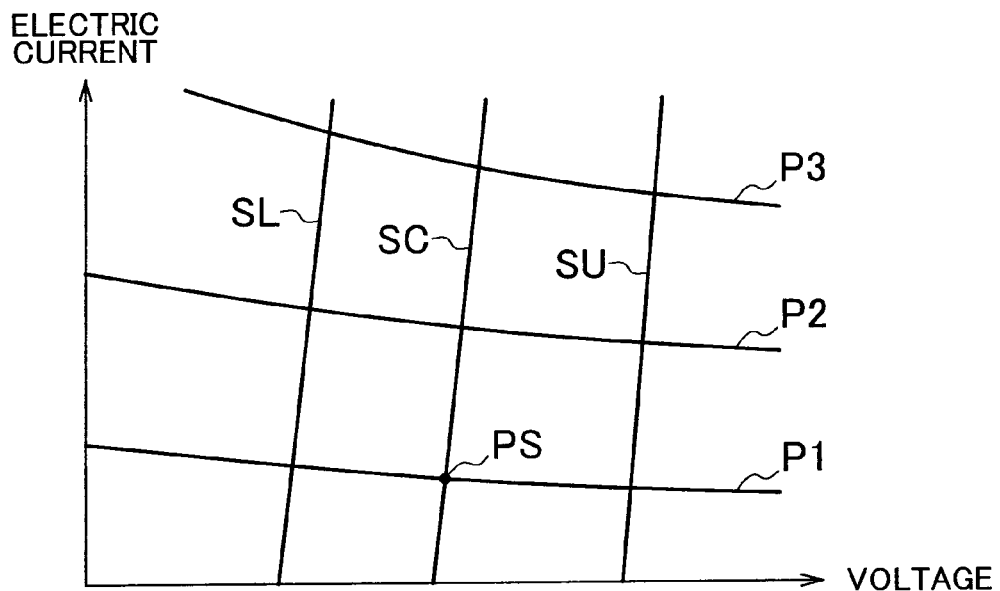
FIG. 4 is a diagram showing the charging characteristic of a power storage device.

FIG. 4 is a diagram showing the charging characteristic of the power storage device 240. In FIG. 4, the abscissa axis indicates the voltage of the power storage device 240, and the ordinate axis indicates the charging electric current supplied to the power storage device 240. Curves P1, P2, and P3 indicate constant power lines. The charging electric power indicated by the curve P3 is higher than the charging electric power indicated by the curve P2, and the charging electric power indicated by the curve P2 is higher than the charging electric power indicated by the curve P1. Lines SL, SC, and SU indicate constant SOC lines. The line SL corresponds to the lower limit value of the SOC, and the line SU corresponds to the upper limit value of the SOC. The line SC indicates the current SOC (i.e., the SOC before charging is performed).

If the initial value of the charging electric power is set to the curve P1, the initial value of the transmitted electric power is set based on the initial value of the charging electric power. An intersection PS of the curve P1 and the line SC indicating the current SOC indicates the charging impedance of the power storage device 240 at a time when the charging is started (i.e., the charging start impedance). A map showing the relation between the charging impedance and the impedance of the impedance matching device 120 is prepared in advance. The initial value of the impedance of the impedance matching device 120 is set based on the charging start impedance using the map.

Referring to FIG. 3 again, after the initial value of the transmitted electric power and the initial value of the impedance of the impedance matching device 120 are set in step S30, the ECU 140 outputs a power generation command to the power source device 110. Thus, the electric power transmission from the power supply device 100 to the vehicle 200 is started (step S40). The ECU 140 controls the output of the power source device 110 so that the electric power output from the power source device 110 (i.e., the traveling-wave electric power) is equal to the initial value of the transmitted electric power.

After the electric power transmission from the power supply device 100 to the vehicle 200 is started, the ECU 140 receives, from the electric power sensor 150, the detected value of the reflected electric power to the power source device 110 (step S50). Then, the ECU 140 adjusts the impedance of the impedance matching device 120 to decrease the reflected electric power to the power source device 110. (step S60).

Then, the ECU 140 obtains the information regarding the power receiving situation in the vehicle 200 using the communication device 160 (step S70). The information regarding the power receiving situation in the vehicle 200 is detected in the vehicle 200, and transmitted from the communication device 280 to the power supply device 100. Then, the ECU 140 calculates the power transmission efficiency $\eta$ in the electric power transmission from the power supply device 100 to the vehicle 200, based on the received electric power that is the information regarding the power receiving situation in the vehicle 200, and the electric power output from the power source device 110 (step S80). The electric power output from the power source device 110 is detected, as the traveling-wave electric power, by the electric power sensor 150.

After the power transmission efficiency η is calculated, the ECU 140 determines whether the power transmission efficiency η is lower than the predetermined threshold value ηth (step S90). If it is determined that the power transmission efficiency η is lower than the threshold value ηth (YES in step S90), the ECU 140 determines whether the reflected electric power is lower than the predetermined threshold value Pth (step S100).

If it is determined that the reflected electric power is lower than the threshold value Pth (YES in step S100), the routine proceeds to step S120. In step S120, the ECU 140 performs a first stop process (described later) (step S120). If it is determined that the reflected electric power is equal to or higher than the threshold value Pth (NO in step S100), the ECU 140 determines whether the reflected electric power is higher than the permissible value (step S110).

If it is determined that the reflected electric power is higher than the permissible value (YES in step S110), the routine proceeds to step S120. In step S120, the ECU 140 performs the first stop process (described later) (step S120). If it is determined that the reflected electric power is equal to or lower than the permissible value (NO in step S110), the routine returns to step S50, and the ECU 140 performs the process in step S50.

If it is determined that the power transmission efficiency η is equal to or higher than the predetermined threshold value ηth in step S90 (NO in step S90), the ECU 140 determines whether there is the power supply end command (step S130). The power supply end command may be generated in the vehicle 200 and may be transmitted to the power supply device 100, or the power supply end command may be generated in the power supply device 100. If it is determined that there is the power supply end command (YES in step S130), the ECU 140 performs a second stop process (described later) (step S140). If it is determined that there is no power supply end command (NO in step S130), the ECU 140 increases the transmitted electric power by a predetermined amount (step S150), and then, the routine returns to step S50.

Figure 5:
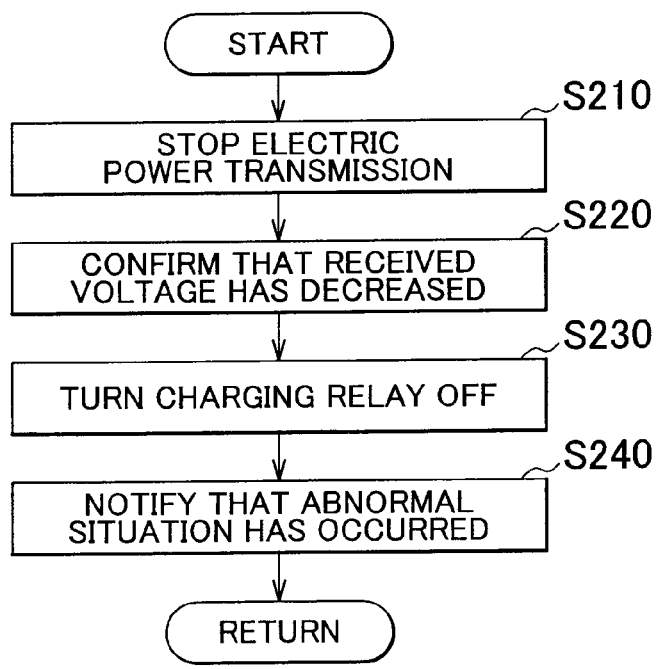
FIG. 5 is a flowchart used to explain a first stop process in step S120 shown in FIG. 3.

FIG. 5 is a flowchart used to explain the first stop process in step S120 shown in FIG. 3. As shown in FIG. 5, the ECU 140 outputs a stop command to the power source device 110. Thus, the electric power transmission from the power supply device 100 to the vehicle 200 is stopped (step S210). Then, the ECU 140 confirms that the received voltage in the vehicle 200 has decreased (step S220). For example, the detected value of the received voltage in the vehicle 200 is transmitted from the vehicle 200 to the power supply device 100 so that the ECU 140 in the power supply device 100 confirms that the received voltage has decreased.

After it is confirmed that the received voltage has decreased, the ECU 140 uses the communication device 160 to transmit a command indicating that the charging relay 230 in the vehicle 200 should be turned off, to the vehicle 200 so that the charging relay 230 is turned off (step S230). Then, the ECU 140 notifies the notification device 170 that the supply of electric power from the power supply device 100 to the vehicle 200 has been ended due to an abnormal situation, and the notification device 170 notifies the user that the abnormal situation has occurred (step S240).

Figure 6:
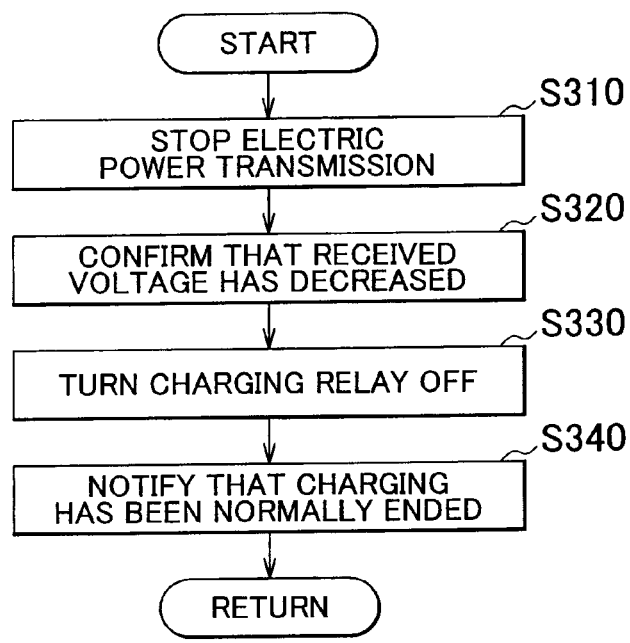
FIG. 6 is a flowchart used to explain a second stop process in step S140 shown in FIG. 3.

FIG. 6 is a flowchart used to explain the second stop process in step S140 shown in FIG. 3. As shown in FIG. 6, processes in step S310 to S330 are the same as the processes in step S210 to S230 shown in FIG. 5, and therefore, the description thereof will not be repeated.

After the charging relay 230 in the vehicle 200 is turned off in step S330, the ECU 140 notifies the notification device 170 that the supply of electric power from the power supply device 100 to the vehicle 200 has been normally ended, and the notification device 170 notifies the user that the supply of electric power has been normally ended, that is, the charging has been normally ended (step S340).

Figure 7:
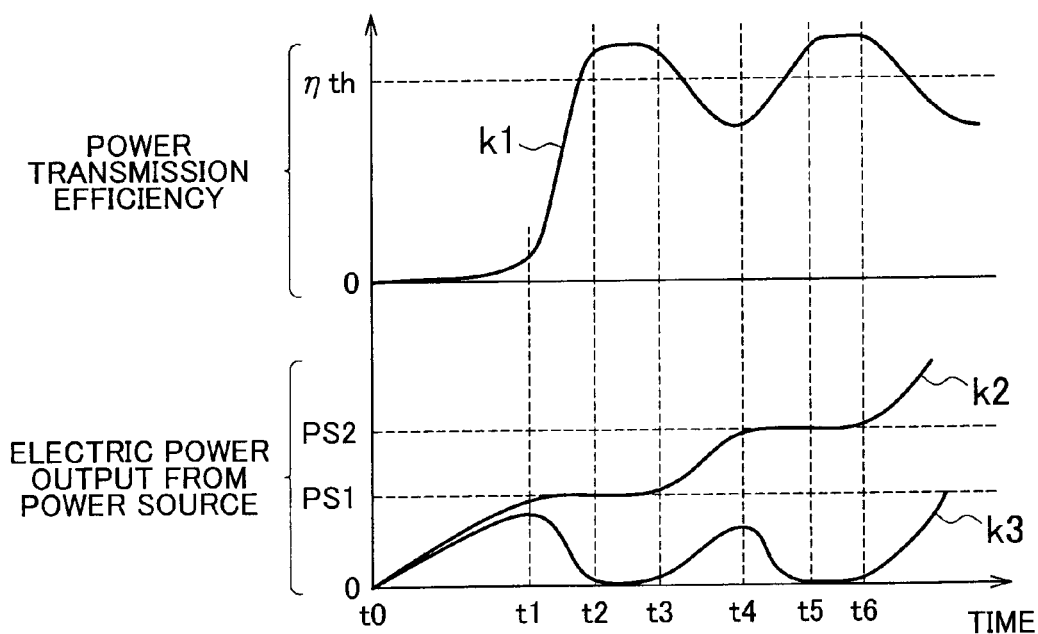
FIG. 7 is a timing chart showing a power transmission efficiency and electric power output from a power source device when electric power is supplied from a power supply device to a vehicle.

FIG. 7 is a timing chart showing the power transmission efficiency η and the electric power from the power source device 110 when electric power is supplied from the power supply device 100 to the vehicle 200. As shown in FIG. 7, a curve k1 indicates the power transmission efficiency η. A curve k2 indicates the traveling-wave electric power from the power source device 110 (i.e., the electric power output from the power source device 110). A curve k3 indicates the reflected electric power to the power source device 110.

After the electric power transmission is started at a time point t0, the traveling-wave electric power increases. However, the impedances have not been sufficiently matched, and therefore, the reflected electric power also increases. As a result, the power transmission efficiency is low. When the traveling-wave electric power reaches a first target PS1 at a time point t1, the impedance matching device 120 starts impedance adjustment based on the reflected electric power. That is, the impedance of the impedance matching device 120 is adjusted to decrease the reflected electric power. Then, the first adjustment is completed at a time point t2, and the power transmission efficiency η at this time point is compared with the threshold value ηth.

If the power transmission efficiency η is equal to or higher than the threshold value ηth, the traveling-wave electric power starts to increase at a time point t3. As the traveling-wave electric power increases, the impedances deviate from each other, and therefore, the reflected electric power increases. As a result, the power transmission efficiency decreases. When the traveling-wave electric power reaches a second target PS2 at a time point t4, the impedance matching device 120 starts the impedance adjustment again based on the reflected electric power. The second adjustment is completed at a time point t5, and the power transmission efficiency η at this time point is compared with the threshold value ηth again. Then, because the power transmission efficiency η is equal to or higher than the threshold value ηth, the traveling-wave electric power starts to increase at a time point t6 again.

As described above, in the embodiment, the electric power transmission from the power transmitting unit 130 is controlled based on the information regarding the power receiving situation in the vehicle 200 and the reflected electric power to the power source device 110. More specifically, if the power transmission efficiency η is lower than the threshold value ηth and the reflected electric power is lower than the threshold value Pth, the electric power transmission is stopped. Accordingly, in the embodiment, it is possible to prevent the occurrence of a situation where the impedance of the power transmitting unit 130 matches the impedance of a device other than the power receiving unit 210 or the impedance of space. As a result, it is possible to transmit electric power with a high power transmission efficiency.

Also, in the embodiment, if the power transmission efficiency η is lower than the threshold value ηth and the reflected electric power is higher than the permissible value, the electric power transmission is stopped. Accordingly, in the embodiment, it is possible to prevent the occurrence of a situation where the power source device 110 malfunctions due to excessively large reflected electric power.

Also, in the embodiment, if the electric power transmission is stopped due to the above-described abnormal situation, the notification device 170 notifies the user that the abnormal situation has occurred. Therefore, the user can recognize that electric power is not normally supplied from the power supply device 100 to the vehicle 200. Accordingly, in the embodiment, it is possible to provide the user with, for example, an incentive to perform position adjustment for the vehicle 200 and the power supply device 100 again.

Also, in the embodiment, the initial value of the impedance of the impedance matching device 120 is set based on the charging impedance of the power storage device 240. Then, the impedance of the impedance matching device 120 is adjusted to decrease the reflected electric power. Accordingly, in the embodiment, it is possible to transmit electric power with a high power transmission efficiency.

In the above-described embodiment, the primary self-resonant coil 134 in the power supply device 100 resonates with the secondary self-resonant coil 212 in the vehicle 200 to transmit electric power. However, paired high-dielectric constant discs may be used in the power transmitting unit 130 and the power receiving unit 210. The high-dielectric constant disc is made of a high-dielectric constant material. For example, $TiO_2$, $BaTi_4O_9$, and $LiTaO_3$ may be used to form the high-dielectric constant disc.

In the above-described embodiment, the electric power sensor 150 may be regarded as an example of "the detection device" according to the invention. The infrastructure-side ECU 140 may be regarded as an example of "the control device that controls electric power transmission" according to the invention. The impedance matching device 120 may be regarded as an example of "the impedance variable device" according to the invention. Further, the voltage sensor 260 and the electric current sensor 270 may be regarded as constituting an example of "the detection device that detects the information regarding the power receiving situation". The charging ECU 250 may be regarded as an example of "the control device that transmits the generated command to the power supply device" according to the invention. In the above-described embodiment, the infrastructure-side ECU 140 controls the electric power transmission from the power transmitting unit based on the information regarding the power receiving situation and the reflected electric power. However, the configuration may be such that the communication device 280 in the power receiving device receives the detected value of the reflected electric power, and the control device in the power receiving device (i.e., the charging ECU 250) generates a command for controlling the electric power transmission from the power supply device, based on the information regarding the power receiving situation and the reflected electric power, and transmits the generated command to the power supply device using the communication device 280.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A power supply device that supplies electric power to a power receiving device including a power receiving unit in a non-contact manner, the power supply device comprising:

a power source device that generates electric power with a predetermined frequency;
a power transmitting unit that receives the electric power from the power source device, and that resonates with the power receiving unit through an electromagnetic field, thereby transmitting the electric power to the power receiving unit in the non-contact manner;
a detection device that detects reflected electric power to the power source device;
a communication device that receives a power receiving situation in the power receiving device; and
a control device that controls electric power transmission from the power transmitting unit based on the power receiving situation and the reflected electric power,
wherein the control device calculates a power transmission efficiency from the power supply device to the power receiving device, based on received electric power that indicates the power receiving situation, and the electric power output from the power source device,
the control device controls the electric power transmission from the power transmitting unit, based on the power transmission efficiency and the reflected electric power and
if the power transmission efficiency is lower than a predetermined first threshold value and the reflected electric power is lower than a predetermined second threshold value, the control device stops the electric power transmission from the power transmitting unit.

2. The power supply device according to claim 1, wherein if the power transmission efficiency is lower than the predetermined first threshold value and the reflected electric power is higher than a predetermined permissible value, the control device stops the electric power transmission from the power transmitting unit.

3. The power supply device according to claim 1, further comprising
a notification device that notifies a user when the electric power transmission from the power transmitting unit is stopped.

4. The power supply device according to claim 1, further comprising
an impedance variable device provided between the power source device and the power transmitting unit, wherein
the power receiving device includes a load connected to the power receiving unit, and
the control device initially sets an impedance of the impedance variable device based on an impedance of the load, and adjusts the impedance of the impedance variable device in such a manner as to decrease the reflected electric power.

5. The power supply device according to claim 4, wherein the load includes a power storage device that is rechargeable, and
the control device initially sets the impedance of the impedance variable device based on a charging impedance of the power storage device, the charging impedance being determined in accordance with a state of charge of the power storage device.

6. A control method for a power supply system in which a power transmitting unit in a power supply device resonates with a power receiving unit in a power receiving device through an electromagnetic field to supply electric power from the power supply device to the power receiving device in a non-contact manner, the control method comprising:
a step of detecting reflected electric power to a power source device in the power supply device;

a step of detecting a power receiving situation in the power receiving device; and a step of controlling electric power transmission from the power supply device to the power receiving device based on the power receiving situation and the reflected electric power, wherein the step of controlling the electric power transmission includes:

a step of calculating a power transmission efficiency from the power supply device to the power receiving device, based on received electric power that indicates the power receiving situation, and electric power output from the power source device; and a step of controlling electric power transmission from the power transmitting unit based on the power transmission efficiency and the reflected electric power, and the step of controlling the electric power transmission from the power transmitting unit includes:

a step of determining whether the power transmission efficiency is lower than a predetermined first threshold value;

a step of determining whether the reflected electric power is lower than a predetermined second threshold value, if it is determined that the power transmission efficiency is lower than the first threshold value; and stopping the electric power transmission from the power transmitting unit, if it is determined that the reflected electric power is lower than the second threshold value.

7. The control method according to claim 6, wherein the steps of controlling the electric power transmission from the power transmitting unit further includes:

a step of determining whether the reflected electric power is higher than a predetermined permissible value, if it is determined that the power transmission efficiency is lower than the first threshold value; and a step of stopping the electric power transmission from the power transmitting unit, if it is determined that the reflected electric power is higher than the permissible value.

8. The control method according to claim 6, further comprising notifying a user when the electric power transmission from the power transmitting unit is stopped.

9. The control method according to claim 6, wherein the power supply device includes an impedance variable device provided between the power source device and the power transmitting unit, and the power receiving device includes a load connected to the power receiving unit; and the control method further includes:

a step of initially setting an impedance of the impedance variable device based on an impedance of the load; and a step of adjusting the impedance of the impedance variable device in such a manner as to decrease the reflected electric power.

10. The control method according to claim 9, wherein the load includes a power storage device that is rechargeable; and in the step of initially setting the impedance, the impedance of the impedance variable device is initially set based on a charging impedance of the power storage device, the charging impedance being determined in accordance with a state of charge of the power storage device.

* * * * *